(12) United States Patent
Ali Lahib et al.

(10) Patent No.: US 10,879,765 B2
(45) Date of Patent: Dec. 29, 2020

(54) GENERATOR SYSTEM UTILIZING TRANSPORTATION WEIGHTS AND PROPULSION ON ROADS

(71) Applicants: Musbah Ali Lahib, Sharjah (AE); Hussein Ali Lahib, Baabda (LB)

(72) Inventors: Musbah Ali Lahib, Sharjah (AE); Hussein Ali Lahib, Baabda (LB)

(*) Notice: Subject to any disclaimer, the term of this patent is extended or adjusted under 35 U.S.C. 154(b) by 0 days.

(21) Appl. No.: 15/746,784

(22) PCT Filed: Jul. 6, 2017

(86) PCT No.: PCT/IB2017/054087
§ 371 (c)(1),
(2) Date: Jan. 22, 2018

(87) PCT Pub. No.: WO2019/008420
PCT Pub. Date: Jan. 10, 2019

(65) Prior Publication Data
US 2020/0119617 A1    Apr. 16, 2020

(51) Int. Cl.
*H02K 7/18* (2006.01)
*B65G 23/22* (2006.01)

(52) U.S. Cl.
CPC .......... *H02K 7/1853* (2013.01); *B65G 23/22* (2013.01)

(58) Field of Classification Search
CPC ........ H02K 7/18; H02K 11/00; H02K 7/1853; H02K 7/1861; H02N 3/00; H02N 11/00; H02P 9/04; F01B 9/00; F01B 15/02; B65G 23/22

USPC .......................................................... 290/1 R
See application file for complete search history.

(56) References Cited

U.S. PATENT DOCUMENTS

| 5,319,366 A |   | 6/1994  | Mendeleev |           |
|---|---|---|---|---|
| 5,355,674 A | * | 10/1994 | Rosenberg | F04B 35/00 |
|             |   |         |           | 290/1 R    |
| 6,376,925 B1| * | 4/2002  | Galich    | F03G 7/08  |
|             |   |         |           | 290/1 R    |
| 7,067,932 B1| * | 6/2006  | Ghassemi  | F03G 7/08  |
|             |   |         |           | 290/1 R    |

(Continued)

FOREIGN PATENT DOCUMENTS

| CN | 1877118 A      | 12/2006 |
| DE | 202006002536 U1 | 8/2006  |
| EP | 2527652 A9     | 8/2013  |

OTHER PUBLICATIONS

International Search Report dated Oct. 9, 2017 for Internation Application No. PCT/IB2017/054087.
(Continued)

*Primary Examiner* — James R Bidwell
(74) *Attorney, Agent, or Firm* — Fishman Stewart PLLC

(57) ABSTRACT

A generator system may include a belt configured to support a transportation load. The belt may be located between a first road segment and a second road segment of a road, wherein movement of the belt may generate motive power. The generator system may also include a generator operatively connected to the belt and configured to convert at least a portion of the motive power into electric energy. The generator system may further include an automatic transmission box configured to translate the at least a portion of the motive power to the generator.

20 Claims, 12 Drawing Sheets

(56) References Cited

U.S. PATENT DOCUMENTS

| | | | | |
|---|---|---|---|---|
| 8,251,183 B2* | 8/2012 | Chen | ............... | F03G 7/08 |
| | | | | 185/39 |
| 8,334,603 B2* | 12/2012 | Daya | ............... | B61C 3/00 |
| | | | | 290/1 C |
| 8,740,497 B2* | 6/2014 | Gohmann | ............... | E01C 9/00 |
| | | | | 14/78 |
| 2002/0079254 A1* | 6/2002 | Soldavini | ............... | B65G 17/345 |
| | | | | 209/606 |
| 2003/0034652 A1* | 2/2003 | Slatkin | ............... | F03G 7/08 |
| | | | | 290/1 R |
| 2007/0013328 A1* | 1/2007 | Shemm | ............... | H02K 41/031 |
| | | | | 318/135 |
| 2015/0084334 A1 | 3/2015 | Caruso | | |
| 2017/0070123 A1* | 3/2017 | Wang | ............... | H02K 7/1861 |

OTHER PUBLICATIONS

English Abstract of CN1877118 (A).
English Abstract of DE202006002536 (U1).

\* cited by examiner

GENERATOR SYSTEM UTILIZING TRANSPORTATION WEIGHTS AND PROPULSION ON ROADS

TECHNICAL FIELD

The present disclosure relates to a generator system utilizing transportation weights and/or propulsion of vehicles, including, but not limited to automobiles, trains, and airplanes, and/or non-vehicular loads, including, but not limited to, cargo, merchandise, and the like, on roads, including, but not limited to, conventional roads, railways, and airport runways, and a method thereof.

BACKGROUND

Roads having turns, curves, bends, and slopes present various problems and hazards for vehicles traveling thereon, including, but not limited to, automobiles and trains. Regarding automobiles, accidents may occur due to the takeover of fast automobiles to heavier, slower automobiles, the difficulty related to controlling and steadying automobiles, the narrow magnitude of visibility, a possible fault in an automobile's wheels, like exploding and disconnecting from the automobile, and brake problems, hazards, and faults, especially with regards to heavy automobiles due to excessive use of brakes for necessity. In addition, the automobiles may have excessive consumption of fuel on sloping roads due to the dependence on the engine and an automatic transmission box to aid the brakes in slowing down the automobile. The automobile may further experience straining of parts and therefore consumption of a lot of spare parts, including, but not limited to, brakes, tires, automatic transmission boxes, engines, steering boxes, crosses, etc. Further, the braking of the automobiles may result in pollution due to the emissions from the automobile exhaust, dust, and debris from friction in the automobile's brakes. Regarding the roads and the land themselves, the roads may experience exhaustion and a shortened life expectancy, mostly due to heavy automobiles, and land area may be wasted to pass over a relatively short distance due to long turns that are meant to reduce the steepness of the sloping road. Finally, these turns may be a source of danger, damage and exhaustion to automobiles, road users, the road itself, and the surrounding areas.

Regarding trains, accidents may similarly occur due to the difficulty of controlling the train and the narrow range of visibility. Trains may also experience brake problems, hazards, and faults. Trains on the sloping roads and railways may also result in excessive consumption of fuel due to the dependence of the trains on the engine and automatic transmission box to aid the brakes in slowing down the trains, which further increases pollution. Like automobiles, the trains may also experience straining of parts and therefore consumption of a lot of spare parts, including, but not limited to, brakes, engine and automatic transmission boxes. Further, trains on the sloping railways may result in pollution due to the emissions from train exhaust and dust and debris from friction in the train's brakes. The railway itself may experience exhaustion and a shortened life expectancy, and land area may be wasted to pass over a relatively short distance due to long turns that are meant to reduce the steepness of the sloping road. Finally, these turns may be a source of danger, damage and exhaustion to the trains, the users of the roads and railways, the roads and railways themselves, and the surrounding areas.

Other roads, such as aircraft runways, also may present various problems and hazards, for example, during landing of the aircrafts on the runways. Such hazards may include, but are not limited to, hazards resulting from faults in landing devices such as failure of the aircraft wheels to take the landing position, forcing the plane to land on its body and cause disasters, hazards due to a decrease in the air pressure of the aircraft's wheels while landing, hazards due to malfunctions in the aircraft's brakes, and hazards due to a disruption in the aircraft's balance or its flip over. In addition, the huge propulsion power of aircrafts generated while landing is generally wasted, resulting in compensating for the costs of suppressing this power by exhausting the aircraft's brakes and consuming fuel, all of which cause pollution.

Finally, there is a general, continued desire for clean, sustainable energy to reduce the dependence on fossil fuels for various reasons, most prominently, the depletion and limited availability of fossil fuels, and their high cost with regards to financial, health, and environmental means.

Accordingly, there exists a need to provide improve road conditions and usage, including on sloped and/or curved roads, to improve safety, vehicle and vehicle part life, costs, and to utilize vehicle power and propulsion on the roads to provide clean sustainable energy, thereby reducing dependence on fossil fuels.

DETAILED DESCRIPTION

Figure 1:
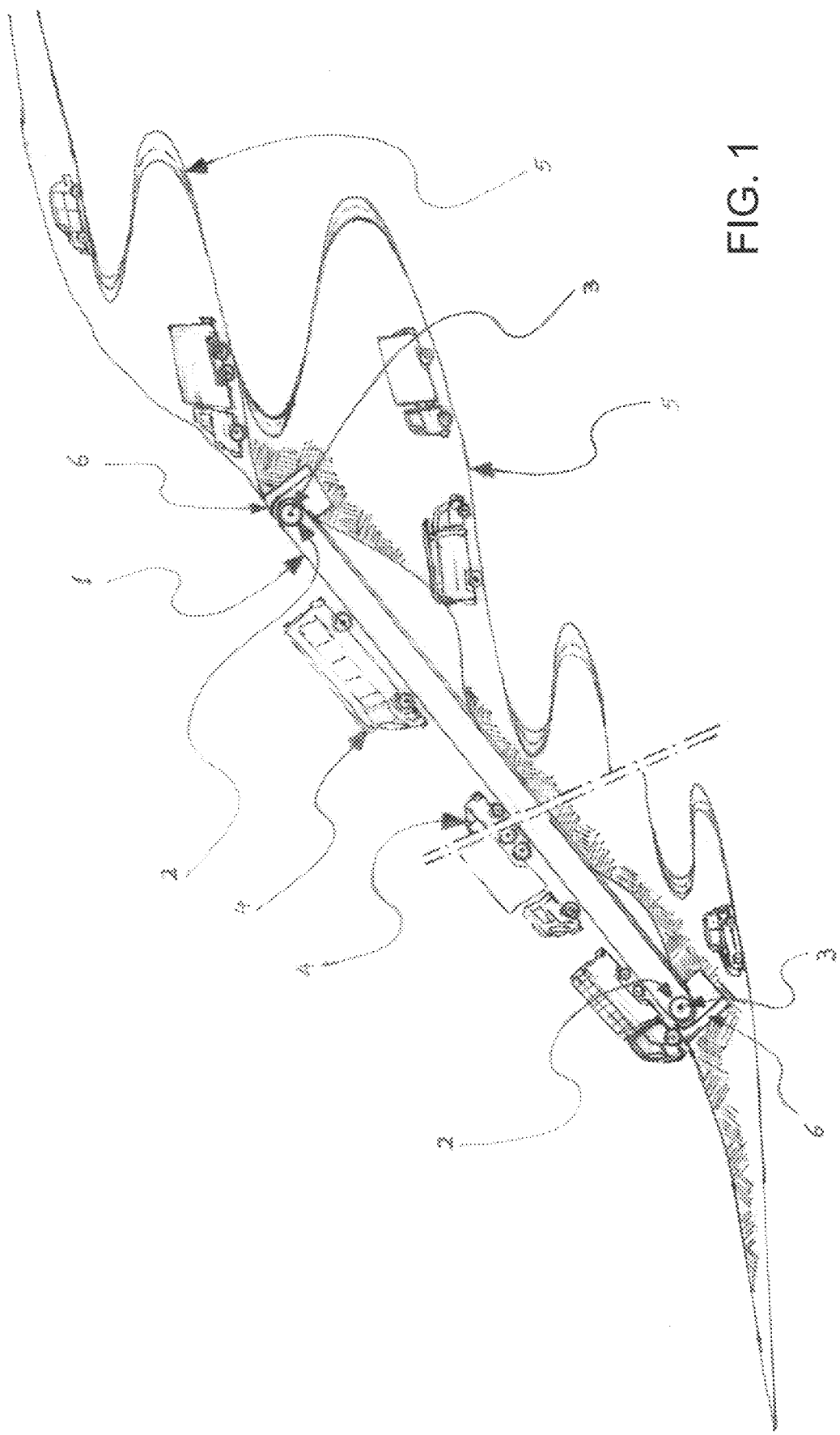
FIG. 1 is a schematic illustration of a generator system according to one exemplary approach, and depicts the difference between the generator system and a conventional sloping road.

Referring now to the discussion that follows and the drawings, illustrative approaches to the disclosed systems and methods are described in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive, otherwise limit, or restrict the claims to the precise forms and configurations shown in the drawings and disclosed in the following detailed description.

An exemplary generator system may include a belt configured to support at least one vehicle. The belt may be located between a first road segment and a second road segment of a road, which may be sloped or level, and which may include, but is not limited to, conventional roads, railway tracks, and airport runways. Movement of the belt may generate motive power. The generator system may also include a generator operatively connected to the belt and configured to convert at least a portion of the motive power into electric energy. The generator system may further include an automatic transmission box configured to translate the at least a portion of the motive power to the generator.

Generally, different road conditions and/or characteristics, for example, sloping roads, may be sources of danger and exhaustion to both the roads and the vehicles travelling thereon, as well as sources of pollution, money, and effort, among other things. The exemplary generator system addresses these considerations by providing safe and clean transportation of vehicles, merchandise, and loads and, at the same, generating alternative, clean, sustainable, and free energy.

Figure 2:
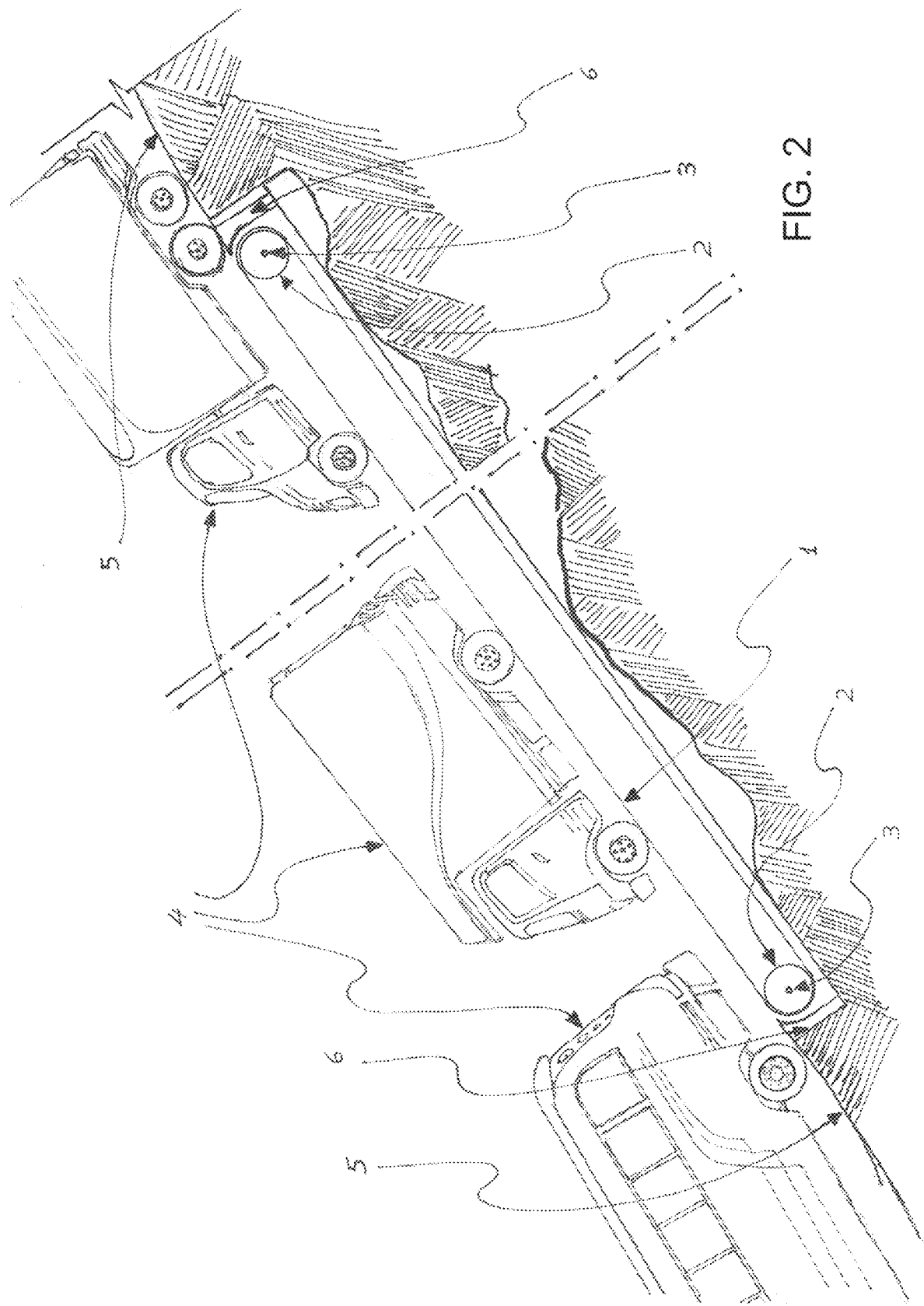
FIG. 2 is an enlarged, partial illustration of the generator system of FIG. 1.
Figure 3:
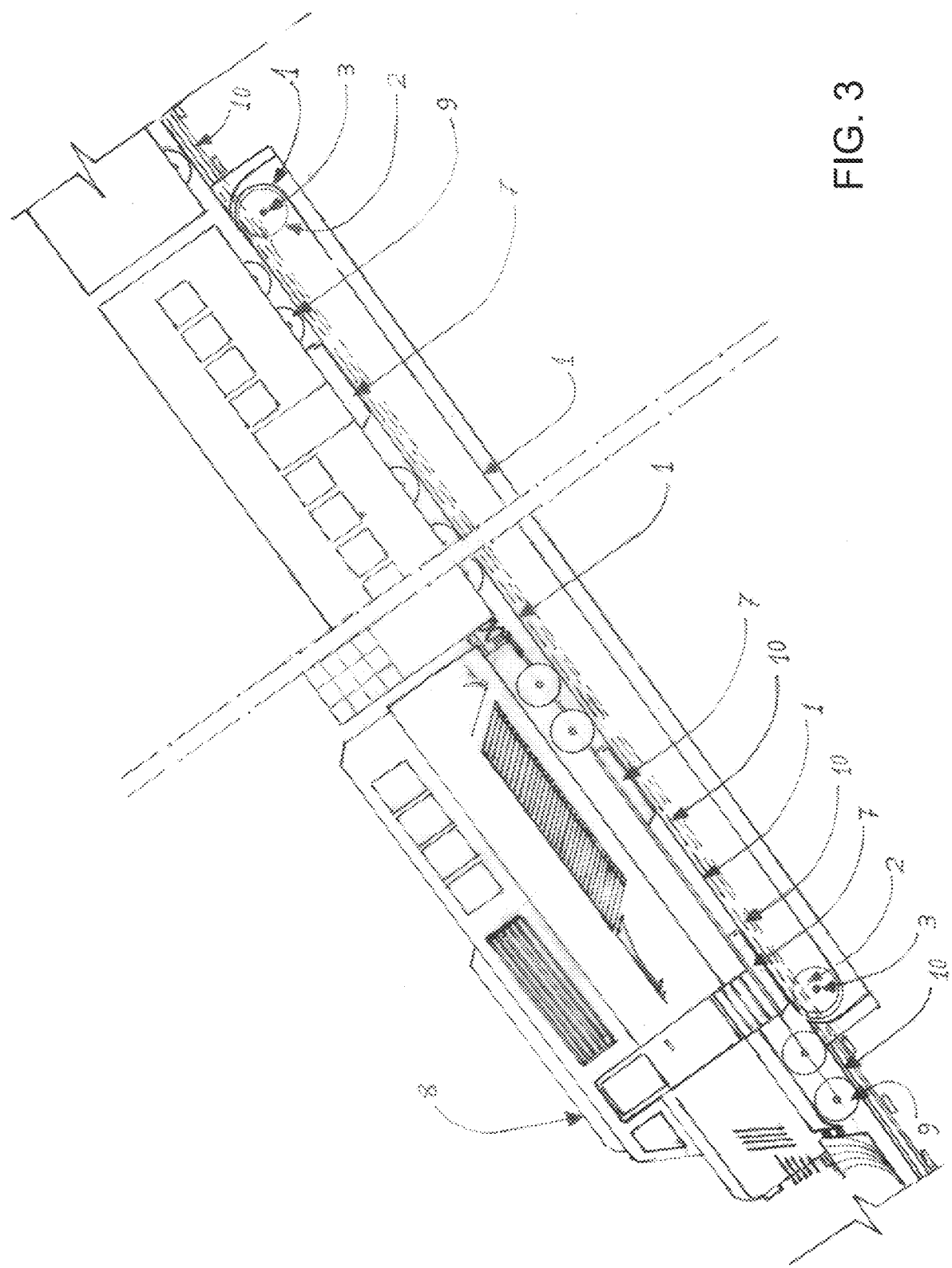
FIG. 3 is a schematic illustration of a generator system according to another exemplary approach.
Figure 4:
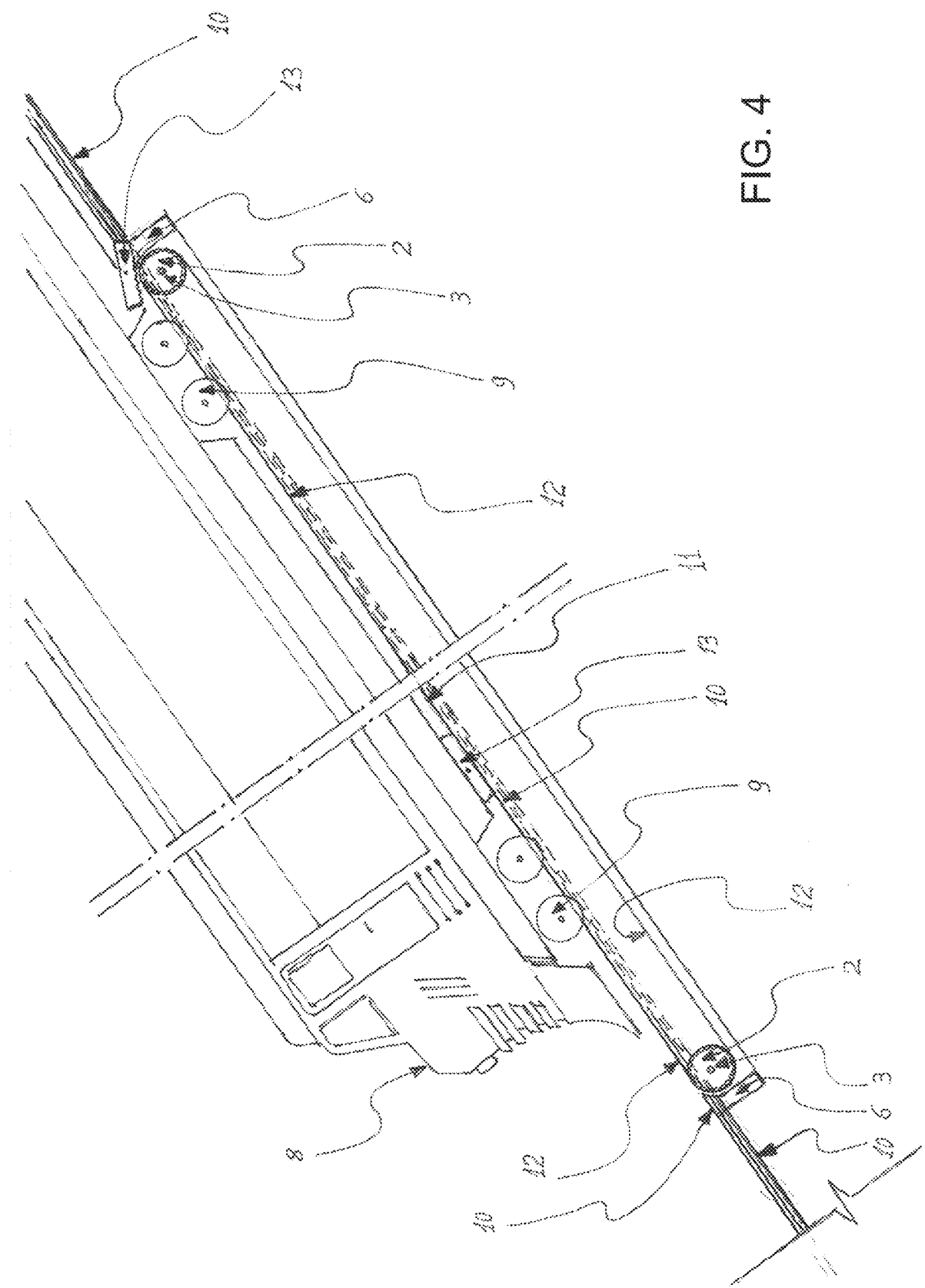
FIG. 4 is a schematic illustration of a generator system according to another exemplary approach.
Figure 5:
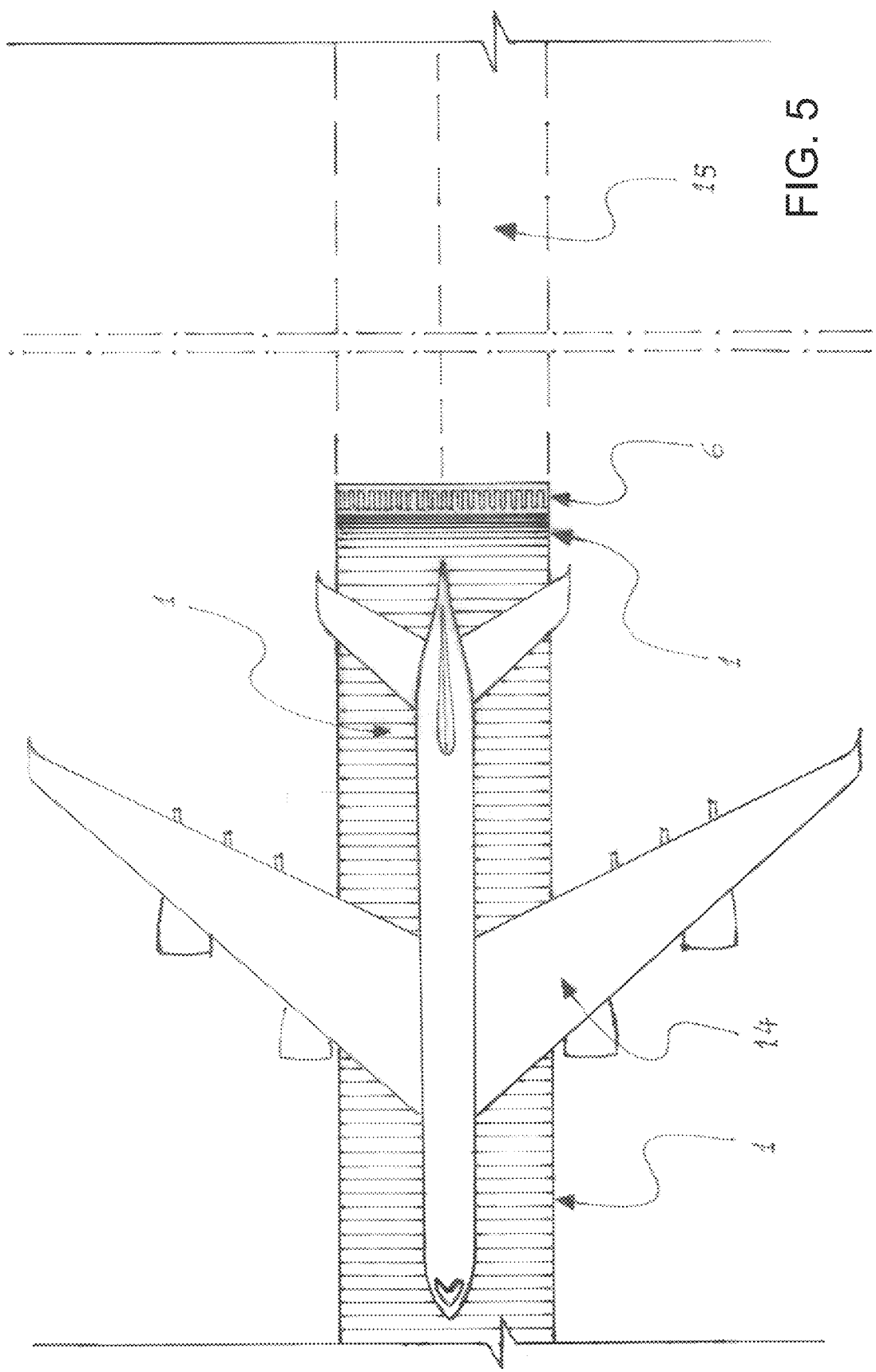
FIG. 5 is a schematic, plan view of a generator system according to another exemplary approach.
Figure 6:
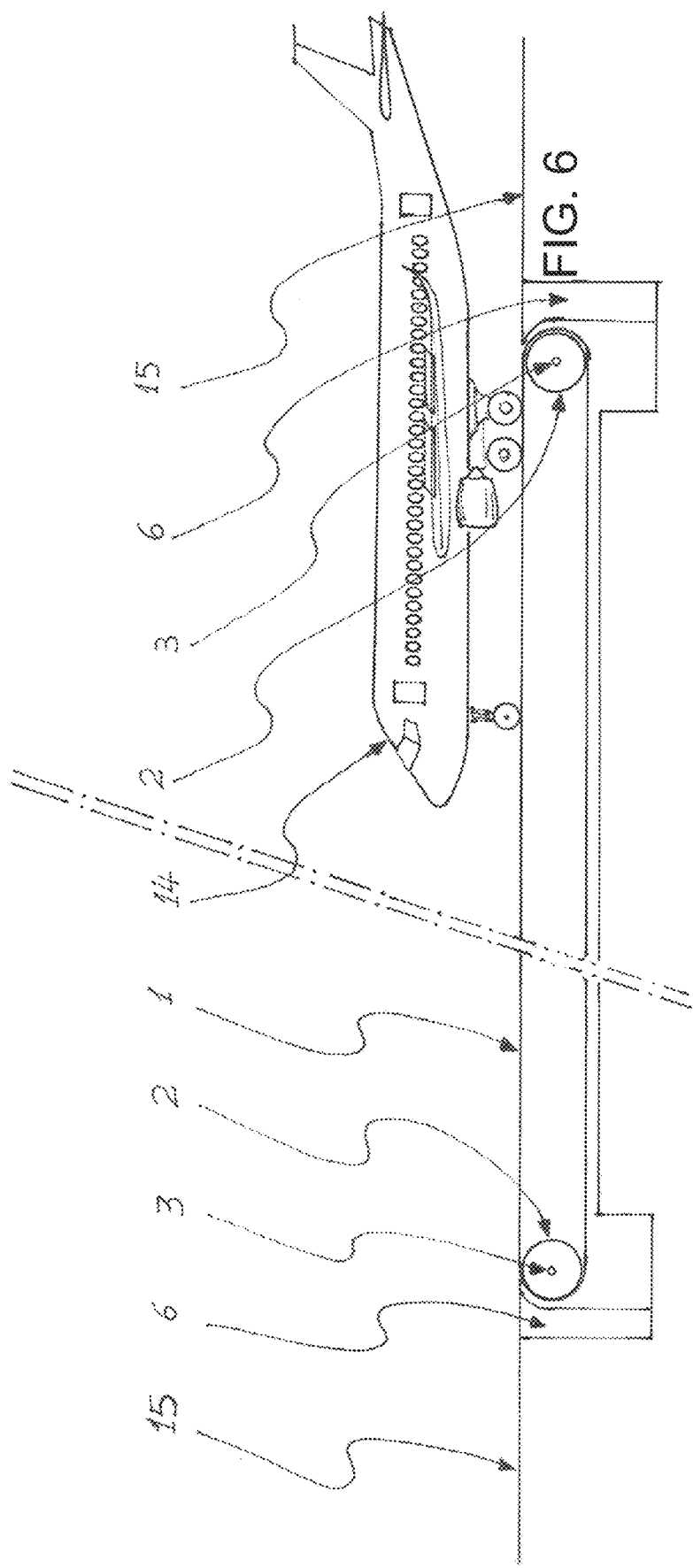
FIG. 6 is a schematic, longitudinal section of the generator system of FIG. 5.
Figure 7:
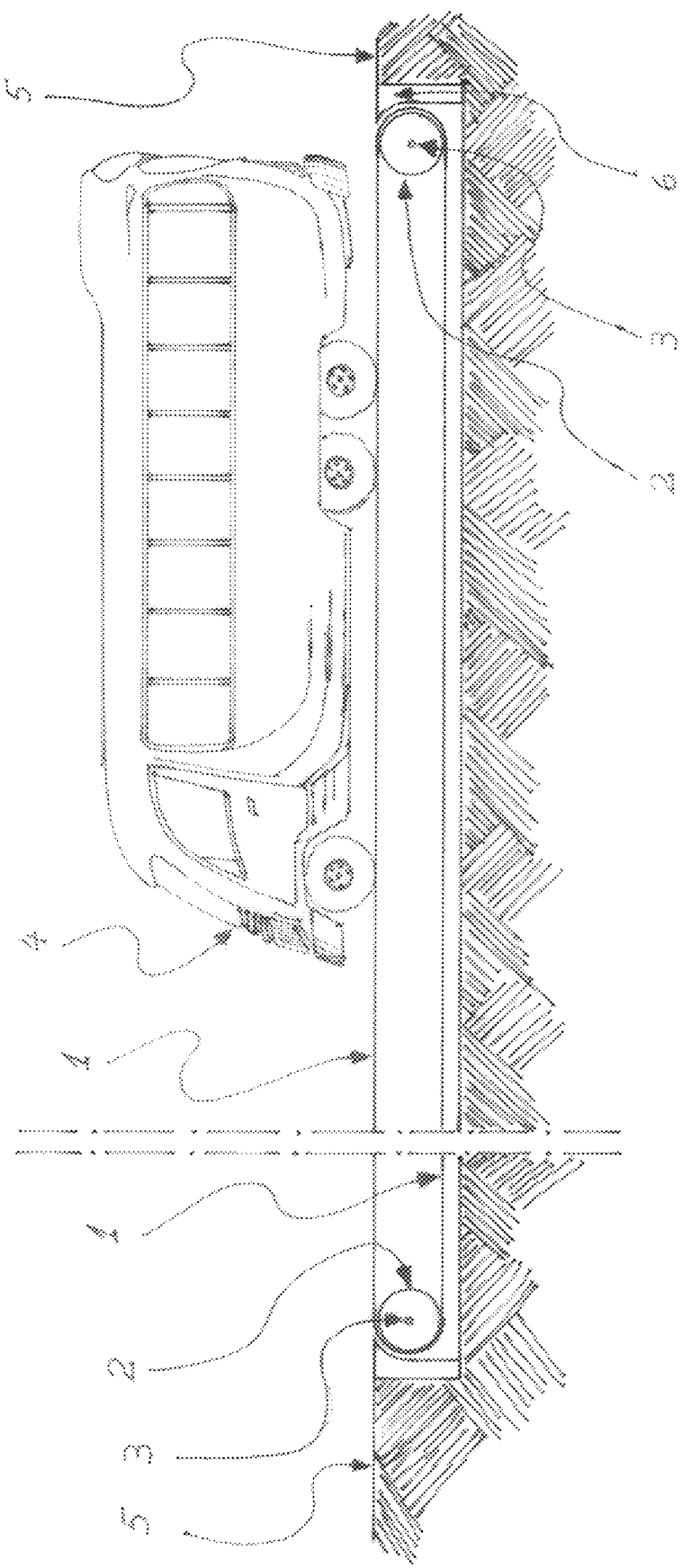
FIG. 7 is a schematic illustration of a generator system according to another exemplary approach.
Figure 8:
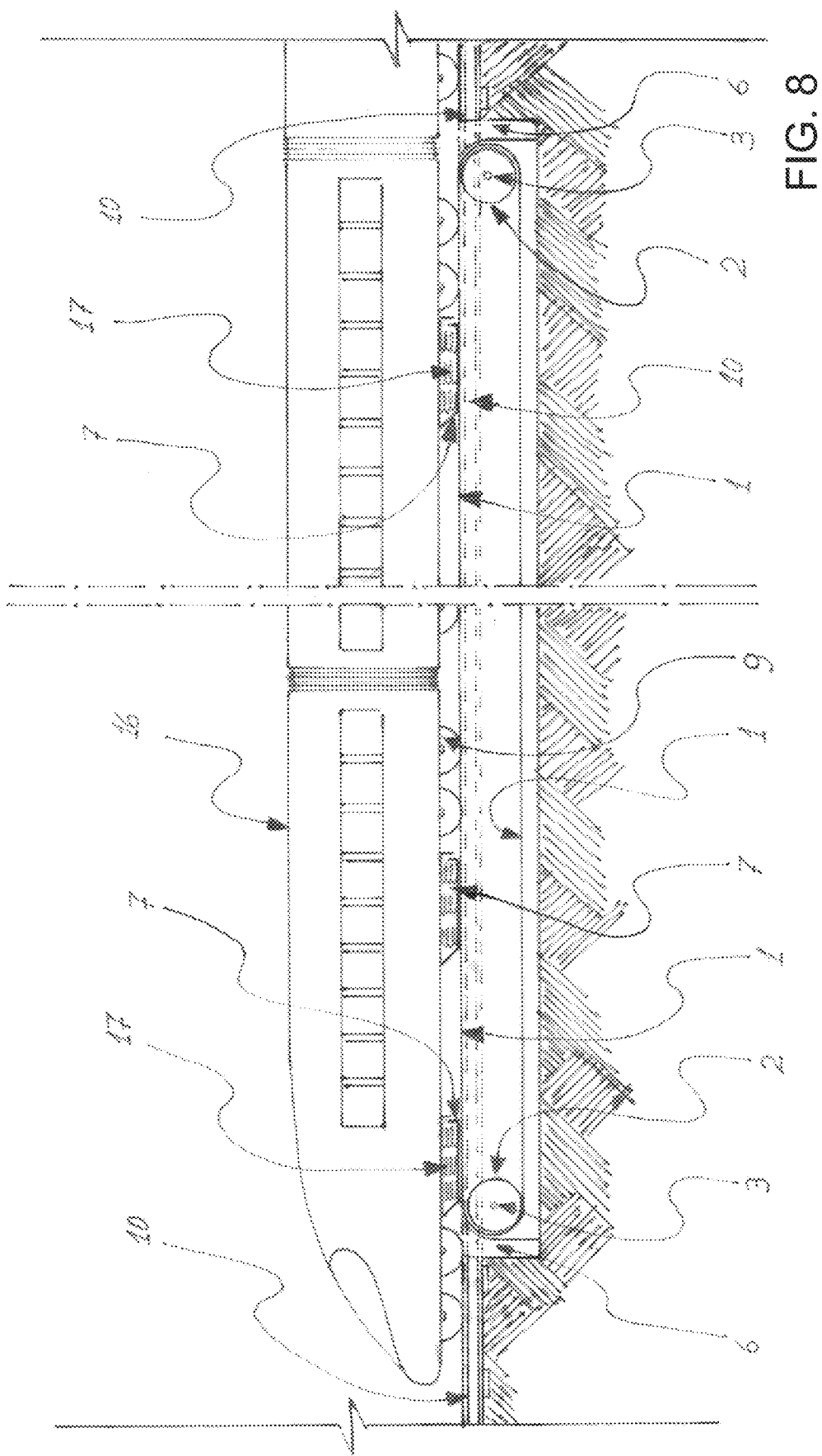
FIG. 8 is a schematic illustration of a generator system according to another exemplary approach.

Referring to the figures, a generator system generally may include a belt 1 configured to receive and support a transportation load thereon, as illustrated in FIGS. 1-8. While the figures illustrate the transportation load as including different vehicles, including, but not limited to automobile(s) 4, train(s) 8 and airplane(s) 15, and are described hereinafter only with respect to such vehicles, it should be appreciated that the transportation load may be any non-vehicular load, including, but not limited to, cargo, merchandise, construction material, rocks, boulders, natural resources, and the like. The belt 1 may be embedded within and/or integrated with a road, which may include, but is not limited to, a conventional road 5, as illustrated in FIGS. 1, 2, and 7, railway tracks 10, as illustrated in FIGS. 3, 4, and 8, and an airport runway 15, as illustrated in FIGS. 5 and 6. The belt 1 may go around two axes 3, and may be, but is not limited to, a transporting singleplex chain, a transporting multiplex chain, such as a triplex chain 12, and a transporting steel rope that goes around the two axes 3. It should be appreciated that the belt 1 may move around one axis 3, two axes 3, or more and may move by wheels on tracks or on magnetic or electromagnetic beds. Moreover, the entire road or certain sections of the road can have the generator system built on them.

Figure 11:
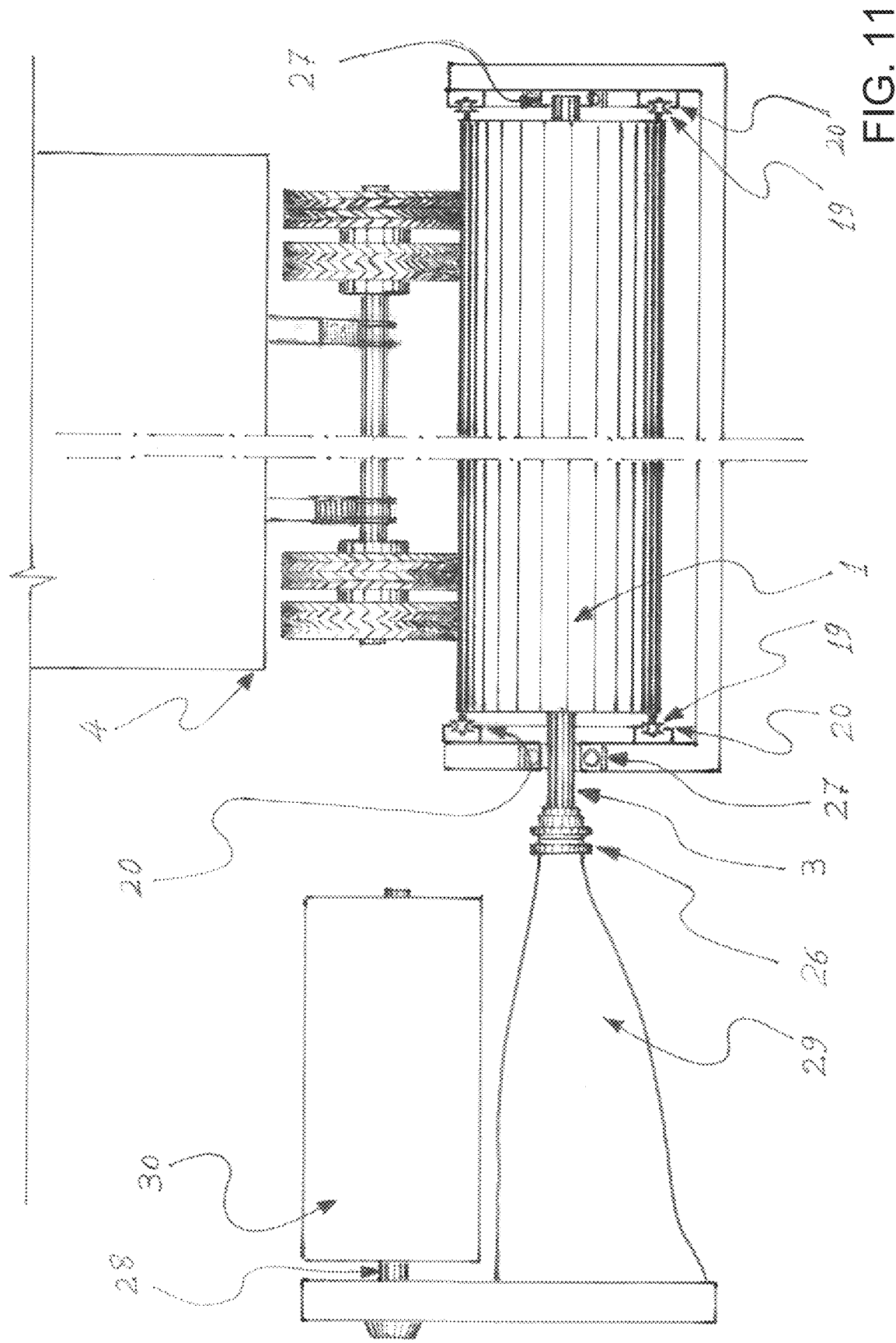
FIG. 11 is a schematic cross section showing the belt of FIG. 9 with a vehicle carried on it, and an automatic transmission box and electrical generator of any one of the generator systems of FIGS. 1, 2, 5, 6, and 7.
Figure 12:
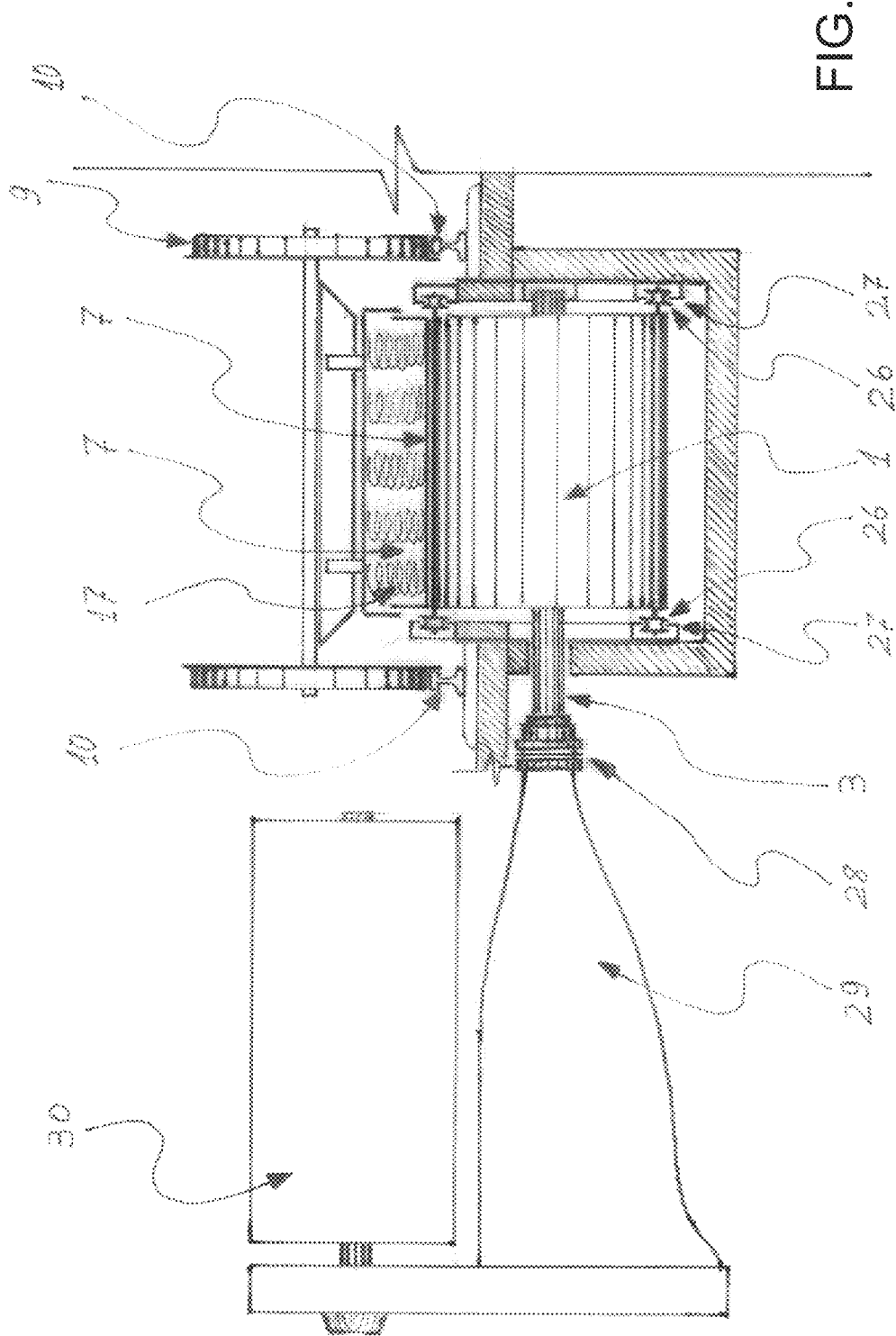
FIG. 12 is a schematic cross section showing the belt of FIG. 10 with a train carried on it both at sloping railways or near train and metro stations.

Referring now to FIGS. 1-4, the generator system may be employed where the road 5/railway tracks 10 are sloped. In such an employment, the generator system generally may run on the power generated from the static weights of the automobile(s) 4/train(s) 8 on the belt 1 at the sloping roads, thereby causing the belt 1 to move. The movement of the belt 1, in turn, may be transmitted to an electrical power generator 30 attached to the belt 1 through an automatic transmission box 29, as illustrated in FIGS. 11 and 12, and a cruise control system. The cruise control system may set a specific speed for the belt 1, which may be determined by settings of the path, so that the surplus difference in the power generated by the static weights and the power of the specified speed of the belt 1 runs the electrical generator 30.

In one exemplary approach illustrated in FIGS. 1 and 2, the metal moving belt 1 may be covered with a thick layer of rubber 11 and may rotate around two shafts or axes 3, one of which may be placed at the beginning of the belt 1 while the second may be at the end of the belt 1. Each shaft 3 may connect two side gears 2. The belt 1 may rotate at the sloped road 5 using the power generated from the weights of the static vehicles 4 on the belt 1 transporting the vehicles 4 and loads from the beginning of the belt 1 to the end of it. The belt 1 may run an electrical generator 30 attached to the belt 1 via an automatic transmission box 29, as illustrated in FIG. 11, and a cruise control system that sets the desired speed by transmitting the surplus/difference in the power generated from the belt's speed and the power generated from the vehicles' and loads' weights to the electrical generator 30.

The sloped roads 5 may be in mountainous regions, and may be long, curved, conventional, or shallow to provide safer routes in such mountainous regions. The belt 1 may replace stretches of such roads 5, being implemented in appropriate sections of the road 5, with regards to the steepness and alignment of the road 5. The implementation of the belt 1 may be advantageous for various reasons. For example, land space used may be saved because the straight belt 1 may connect between the points of departure and arrival via the shortest distance, as seen in FIG. 1. Accordingly, less travelling time will be needed because of the shorter distance travelled. In addition, road maintenance costs may be saved, as vehicles, especially heavy ones, cause exhaustion and damage to the road, particularly on bends, curves, and sloping road sections 5. The belt 1 in this approach may also reduce the losses and risks on vehicles 4, road users, the road itself 5, and the surrounding areas that result from faulty or weak brakes, exploding or disconnecting tires, difficulty in controlling vehicles, overtaking of fast vehicles to slow, heavy vehicles, short visibility, which is overshadowed by the bends and turns, big vehicles, and weather factors. Fuel consumption and spare parts may be saved because vehicles are carried on the belt 1 and are not driven. Further, a healthy environment may be maintained by reducing noise, exhaust emissions, dust, and debris remnants of friction from brakes and other parts. Finally, through the electric generator 30, free, clean, and sustainable energy may be produced.

In another exemplary approach, a sloping conveyor belt 1 that is covered with a thick layer of rubber 11, which runs by the force of gravity similar to the approach illustrated in FIGS. 1 and 2, may be used in overhead, underground, and/or multilayered car parking. Specifically, the belt 1 may be used to transport vehicles 4 from top to bottom and to generate sustainable, free, and clean energy. This approach generally may have the same results and advantages of the approach of FIGS. 1 and 2 explained above, but with less power yield, corresponding to the space of the parking, length of the belt 1, density of traffic on the belt 1, and the size of the vehicles 4.

In another exemplary approach illustrated in FIGS. 3 and 4, a moving conveyer belt 1, which may be covered with a thick layer of rubber 11, may carry a train 8. The belt 1 may move due to the power generated from the train's weight at sloping, mountainous railways 10. The power may run an electrical power generator 30 connected to the belt 1 via an automatic transmission box 29, as illustrated in FIG. 12, and a cruise control system that sets and controls the speed of the belt 1 and the train it carries 8 depending on the settings of the path and its surroundings. The surplus/difference in power between the power generated from the belt's specified speed and the power generated from the train's weight on the belt may be converted to the acceleration or slowing down of the generator to maintain a specified belt 1 speed. The moving belt 1 may allow for the replacement of long, curved, conventional, shallow railways 10.

The implementation of this belt 1 on appropriate sections of railways 10, with regards to the steepness and alignment of the railway, is advantageous in many ways. For example, land space used may be saved because the straight belt 1 may connect between the points of departure and arrival via the shortest distance, as seen in FIGS. 3 and 4. Accordingly, less travelling time will be needed because of the shorter distance travelled. In addition, maintenance costs of the railway may be saved, as trains cause exhaustion and damage to the railway, particularly on bends, curves, and sloping sections. The belt 1 in this approach may also reduce the losses and risks on trains 8, the railway 10 itself, and the surrounding areas that result from faulty or weak brakes, difficulty in controlling trains, short visibility, which is overshadowed by the bends and turns. Fuel consumption and spare parts may be saved because trains 8 are carried on the belt 1 and are not driven. Further, a healthy environment may be maintained by reducing noise, exhaust emissions, dust, and debris remnants of friction from brakes and other parts. Finally, through the electric generator 30, free, clean, and sustainable energy may be produced.

Referring now to FIGS. 5-8, the generator system may run on the power generated from the propulsion of vehicles 4, 8, 14 upon braking on the belt 1 near the ends of roads 5, as illustrated in FIG. 7, especially fast roads, railways 10 at train and metro stations, as illustrated in FIG. 8, and airport runways, as illustrated in FIGS. 5 and 6, thereby turning the belt 1 by the vehicles' propulsion. The generated rotations in the belt 1 may be transmitted to the electric generator 30 linked to the belt via an automatic transmission box 29, as illustrated in FIGS. 11 and 12, and an acceleration control system that may slow down the belt 1 to a gradual stop by transmitting the power surplus from the vehicles' propulsion to the generator 30 so that the belt 1 may slow down while the generator 30 accelerates.

As seen in FIGS. 5 and 6, a moving belt 1 that is covered with a thick layer of rubber 11 may be built on airport runways 15 to be used as a safe, moving landing runway for aircrafts.

The belt 1 used on airport runways 15 has three functions. The first and constant function: a moving, metal belt 1 that is covered with a thick layer of rubber 11 and is built on a short distance from the beginning of the fixed runway 15 so that the distance is enough for all the aircraft's wheels to come into contact with the fixed runway before the aircraft 14 continues moving to the moving belt 1, pushing the moving belt with its propulsion while braking. The belt 1 is connected by both of its axes 3 or one of them to a generator 30 (or dynamo) that generates electrical power via an automatic transmission box 29 and an acceleration control system programmed to slow down the belt 1 to a gradual stop by accelerating the generator 30. This is accomplished by converting the power surplus between the belt's power and the power generated from the propulsion of the aircraft 14 on the belt 1 to acceleration in the generator 30 i.e., the belt 1 slows down while the generator 30 accelerates. This results in: the generation of clean, free electrical power and increasing safety factors, that is because the collision of a speeding aircraft with a moving belt that is of the same speed and direction of the aircraft prevents skidding and, therefore, prevents friction, compared with its collision with a fixed runway, where speed is zero.

The second function is for emergency situations. In particular, the belt 1 may be used as a runway for faulty aircrafts 14, for example, aircrafts 14 whose wheels have failed to take the landing position prior to landing or aircrafts that have faulty brakes (in the case of faulty brakes, the aircraft lands on its body without the wheels of the aircraft taking their landing position) or reduced air pressure in their wheels. This function follows the same principle of the first function with the difference of operating shock absorbers on the belt 1. That is because, in this case, the aircraft lands on the moving belt and not before it. In this case, the belt 1 is rotating quickly via a motor prepared especially for this function (or in the neutral state) prior to the aircraft 14 landing on it. Then, upon the aircraft 14 landing on the belt 1, the belt 1 starts slowing down gradually via a sensor programmed for this function and connected to an electrical generator 30, via on reserve brakes equipped for this function, or via both at the same time.

The third function is also for emergency situations. In particular, the belt 1 may be used as an aircraft runway for aircrafts whose brakes have failed. It follows the same working principle as the second function with the difference of having the aircraft 14 land before the belt 1, which is moving slowly in reverse using a motor equipped for this function, then, upon the propulsion of the aircraft 14 on the moving belt 1, the moving belt 1 starts accelerating, slowing down the aircraft to a gradual stop.

Combining the three functions in a single moving runway is the best option to save space and cost. The first function is the constant and fundamental function while the equipment of functions two and three will be ready for connecting, equipping, and transformation when needed. That is because their usage will be rarely necessary.

Referring now to FIG. 7, a steel, moving belt 1 that is covered with a thick layer of rubber 11 may be built near the ends of roads 5, especially fast ones, to gradually reduce the speed of vehicles 4 as the vehicles 4 brake when on the belt 1, causing it to move due to the power generated from the vehicles' propulsion. This, in turn, runs an electrical generator 30 connected to the belt via an automatic transmission box 29, as illustrated in FIG. 11, and a cruise control system programmed to transmit the power surplus generated from the difference in the power of the belt's speed and the power of the vehicles' propulsion to a generator 30 while maintaining a low belt 1 speed. Then, after the vehicles 4 have discharged of their propulsion energy to a generator 30, pump, or any type of machine, the vehicles are moved to the road slowly. Moreover, the belt 1 reduces the stress exerted on the brakes and pollution caused by friction and dust debris produced by the brakes. It should be appreciated that the electric generator 30 can be connected to one or two axes or shafts 3.

Referring now to FIG. 8, a steel, moving belt 1 that is covered with a thick layer of rubber 11 may be built on iron railways 10 near train and metro stations to reduce the train/metro speed gradually. The train brakes upon reaching the belt 1. Braking is accomplished via a horizontal braking pad 7, whose width may be the same as that of the train 8. Vertical springs 17 may be enclosed in the pad 7, and two pads 7 may be attached to every train wagon, though it should be appreciated that there may be any number of pads 7, and that only a subset of the train wagons may have pad(s) 7. The braking pads may be of a specific height so that they may press on the belt 1, causing it to move due to the power of the train's propulsion. The belt 1 may, in turn, cause the running of the electrical generator 30 attached, using an automatic transmission box 29, as illustrated in FIG. 12, and a cruise control system programmed to slow down the belt 1 and, in turn, bring the train 8 to a gradual stop by transmitting the surplus from the difference between the power generated from the belt's speed and the power from the train's propulsion to the electrical generator 30. This may allow the train 16 to discharge its propulsion energy to the generator 30, a pump, or any type of machine. Moreover, the belt 1 may reduce the stress exerted on the brakes and pollution caused by friction and dust debris produced by the brakes. It should be appreciated that the electric generator 30 can be connected to one or two axes or shafts 3.

In another exemplary approach not illustrated, the generator system may include two tracks extending along the length of the sides of a sloping road, each track may carry boxes through which a steel rope may pass. The steel rope may be connected to two axes 3, the first axis at the beginning of the road and the second axis at the end of the road. Each box may project a cylinder that is transverse with the road and able to rotate so that the wheel of the vehicle may be held by the cylinder. The vehicle's wheel may push the cylinder and, in turn, the box, which may clutch the rope, causing the rope to move and rotate the two axes 3, which, in turn, may run an attached electrical generator 30 using an automatic transmission box 29 and a cruise control system that transmit the surplus from the difference between the power generated from the rope's speed and the power from the vehicles' weights or propulsion to the electrical generator 30.

Figure 9:
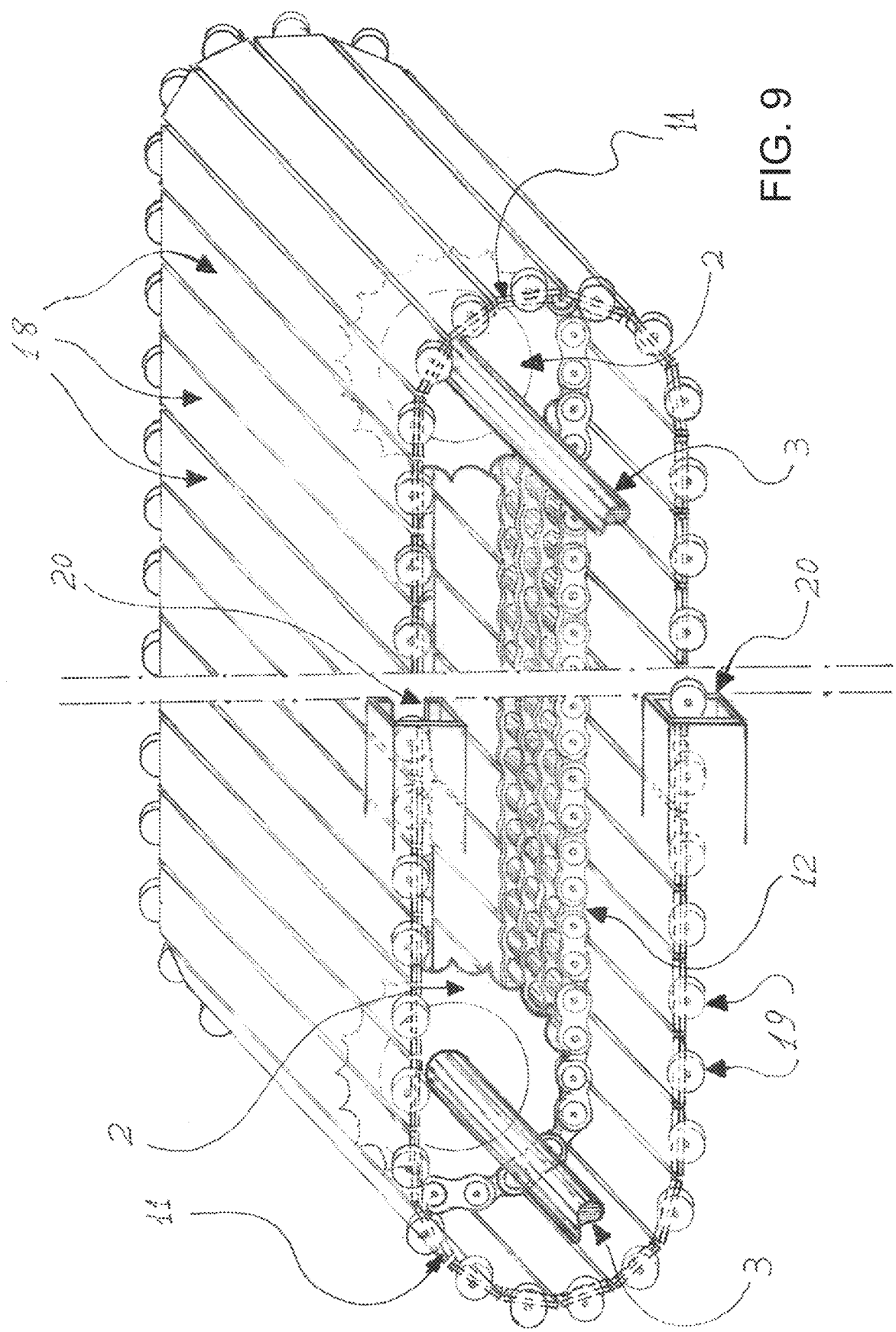
FIG. 9 is a schematic illustration of a belt of any one of the generator systems of FIGS. 1, 2, 5, 6, and 7 according to one exemplary approach.

Referring now to FIG. 9, a metal, moving/conveyor belt 1 that is covered with a thick, strong rubber layer 11 goes around two axes/shafts 3, though it should be appreciated that there may be more than two axes/shafts 3. One of the axes 3 is at the beginning of the belt 1 while the second one is at the end of the belt 1. The belt 1 may be supported and carried by side wheels 19 that travel on two side tracks 20. The belt 1 may be attached to an electrical generator 30 via an automatic transmission box 29 and a speed control system that maintains the speed of the belt 1 at a set speed by transmitting the surplus in the belt's push to the generator 30.

Figure 10:
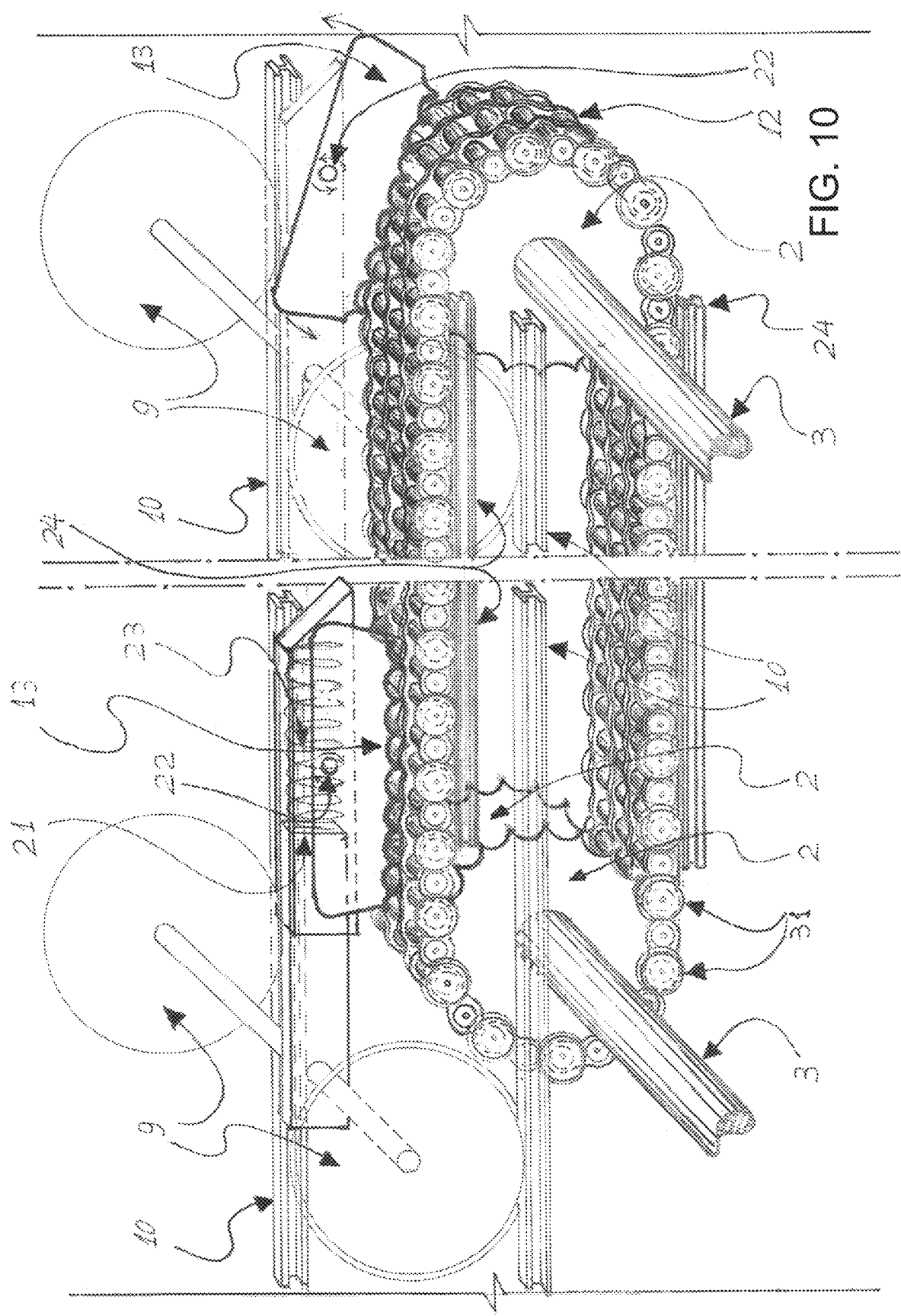
FIG. 10 is a schematic illustration of a belt of any one of the generator systems of FIGS. 3, 4, and 8 according to another exemplary approach.

Referring now to FIG. 10, the belt 1 may be a triplex metal chain 12 that extends along and inside of a longitudinal pit that is in the middle of the two tracks 10 of the train's railway. The triplex chain 12 may travel on two other tracks 24 and may wrap around two round gears 2 at the beginning of the sloping triplex chain track and around two gears 2 at the end of the sloping triplex chain track. Every two gears 2 may have a shaft 3 passing through the middle of the gears 2 so that their rotation may cause the rotation of the shaft 3 as well. The two side chains of the triplex chain 12 may be used for the side, circular gears while the middle chain may be used for the travelling of a metallic, longitudinal gear 13. Each wagon and each locomotive in the train may have two longitudinal gears 13 attached to the bottom of its chassis, though it should be appreciated that each wagon may have any number of longitudinal gears 13 attached thereto, and further, that only a subset of train wagons may employ longitudinal gears 13. The longitudinal gears 13 may be attached to the chassis of wagons and locomotives via a horizontal shock absorber 21, which may contain horizontal springs 23, using pivot hinges 22. The pivot hinges 22 may allow the longitudinal gears 13 to make an incomplete rotation so that the projections of the longitudinal gear can enter smoothly into the spaces of the middle chain. After the longitudinal gear 13 attaches to the middle chain of the triplex chain 12, the longitudinal gear 13 may push the triplex chain with the force of the incoming train 8 and may run an electrical generator 30 that is attached to both of the shafts 3 or one of the shafts 3 on the triplex chain 12. The movement may be transmitted to the electrical generator 30 via an automatic transmission box 29 and a cruise control system by transmitting the power surplus from the power generated from the chain's speed and the power generated from the train's weight on the sloping track to the generator 30.

It is intended that the scope of the present methods and apparatuses be defined by the following claims. However, it must be understood that the disclosed system may be practiced otherwise than is specifically explained and illustrated without departing from its spirit or scope. It should be understood by those skilled in the art that various alternatives to the configuration described herein may be employed in practicing the claims without departing from the spirit and scope as defined in the following claims. The scope of the disclosure should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples.

Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc., should be read to recite one or more of the indicated elements unless a claim recites an explicit limitation to the contrary. It is intended that the following claims define the scope of the device and that the method and apparatus within the scope of these claims and their equivalents be covered thereby. In sum, it should be understood that the device is capable of modification and variation and is limited only by the following claims.

1—Metal moving/conveyor belt
2—Circular gear
3—Rotary axis/shaft
4—Land vehicles
5—Conventional roads
6—A separating metal piece that separates the conventional road from the conveyor belt
7—Horizontal brake pad equipped with springs that press on the conveyor belt and cause it to move
8—The train carried on the belt at sloping roads
9—Train wheel
10—Train railway tracks
11—Strong rubber layer covering the belt
12—A moving, conveyor triplex chain
13—Longitudinal gear rotates 45° around a pivotal axle that allows the gear to be smoothly inserted into the central chain of the triplex chain. The hinge is attached to the chassis by a shock absorber.
14—Aircraft
15—The conventional, fixed aircraft landing runway
16—A train pushing a metal belt before a train station
17—Springs that press on the horizontal brake pad to push the belt
18—Belt blades
19—Small wheels carrying the belt on two small tracks
20—Small tracks on which the wheels bearing the belt travel
21—Shock absorber equipped with horizontal, longitudinal springs to absorb the shock of the first contact between the train and the chain 22—a pivotal hinge that connects the longitudinal gear to the bottom of the chassis via a shock absorber and provides a specific margin of rotation to allow the teeth of the gear to be inserted into the track cavities smoothly
23—Horizontal springs equipped to the shock absorber
24—The small track on which the small wheels of the chain travel
25—Small wheels that carry the chain on the small track
26—A cross joint that connects the automatic transmission box and the rotating shaft
27—Bearing of the belt's rotating shaft
28—Axis/shaft of the electrical generator
29—Automatic transmission box equipped with a regulator and a speed controller
30—Electrical generator

What is claimed is:

1. A generator system comprising:
    a belt configured to support a transportation load, the belt being located between a first road segment and a second road segment of a road, wherein a movement of the belt generates motive power and is generated at least in part by the transportation load on the belt;
    a generator operatively connected to the belt and configured to convert at least a portion of the motive power into electric energy;
    an automatic transmission box configured to translate the at least a portion of the motive power to the generator; and
    a control system configured to reduce a speed of the belt caused by the transportation load.

2. The generator system of claim 1, wherein the road is sloped, and the movement of the belt is generated by at least a static weight of the transportation load.

3. The generator system of claim 2, wherein the control system is a cruise control system configured to maintain a set speed at which the belt moves, wherein a difference between the motive power and power required to move the belt at the set speed is transmitted to the generator.

4. The generator system of claim 1, wherein the transportation load includes at least one vehicle, and the movement of the belt is generated by propulsion of the at least one vehicle caused by braking of the at least one vehicle.

5. The generator system of claim 4, wherein the at least one vehicle is an airplane, and the road is in the form of a runway.

6. The generator system of claim 1, wherein the belt is a metal belt covered with a layer of rubber.

7. The generator system of claim 1, wherein the transportation load is a train, and the road is in the form of railway tracks.

8. The generator system of claim 7, further comprising at least one horizontal braking pad attached to a bottom of at least one wagon of the train, the at least one horizontal braking pad including at least one vertical spring configured to bias the at least one horizontal braking pad to press on the belt thereby causing the belt to move when the train is braking.

9. The generator system of claim 7, wherein the belt includes a triplex chain.

10. The generator system of claim 9, further comprising at least one longitudinal gear attached to a bottom of at least one wagon of the train by a pivot hinge about which the at least one longitudinal gear is partially rotatable, the pivot hinge being configured to prevent the at least one longitudinal gear from making a complete rotation such that projections of the longitudinal gear are able to enter spaces in a middle chain of the triplex chain.

11. The generator system of claim 1, further comprising at least one of:
    a shock absorber; and
    a motor configured to move the belt in at least one of a forward direction and a reverse direction prior to receiving the transportation load.

12. The generator system of claim 1, wherein at least one of:
    the generator system further comprises at least one of electromagnetic beds and magnetic beds on which the belt is movable; and
    the belt includes a plurality of wheels on lateral sides thereof, and the generator system further comprises a track on each lateral side of the belt on which the plurality of wheels on the respective lateral side travel.

13. The generator system of claim 1, further comprising at least two axes about which the belt rotates, one axis being located at a first end of the belt adjacent to the first road segment, and one axis being located at a second end of the belt adjacent to the second road segment.

14. The generator system of claim 13, further comprising at least two gears connected to each axis.

15. The generator system of claim 13, wherein the generator is operatively coupled to at least one of the at least two axes.

16. The generator system of claim 1, further comprising at least one wall separating the belt from at least one of the first road segment and the second road segment.

17. A method comprising:
    receiving at least one transportation load on a belt, thereby causing the belt to move and generate motive power;
    maintaining movement of the belt at a set speed;
    translating, by an automatic transmission box to a generator, a difference between the motive power and power required to move the belt at the set speed; and
    converting, by the generator, the difference between the motive power and the power required to move the belt at the set speed into electric energy.

18. The method of claim 17, wherein moving the belt is generated by a static weight of the transportation load.

19. The method of claim 17, wherein the transportation load includes at least one vehicle, and moving the belt is generated by propulsion of the at least one vehicle caused by braking of the at least one vehicle.

20. A generator system comprising:
    a belt configured to support a transportation load, the belt being located between a first road segment and a second road segment of a road, wherein a movement of the belt generates motive power;
    a generator operatively connected to the belt and configured to convert at least a portion of the motive power into electric energy; and
    an automatic transmission box configured to translate the at least a portion of the motive power to the generator;
    wherein the transportation load includes at least one vehicle, and the movement of the belt is generated by propulsion of the at least one vehicle caused by braking of the at least one vehicle.

* * * * *